UNITED STATES PATENT OFFICE.

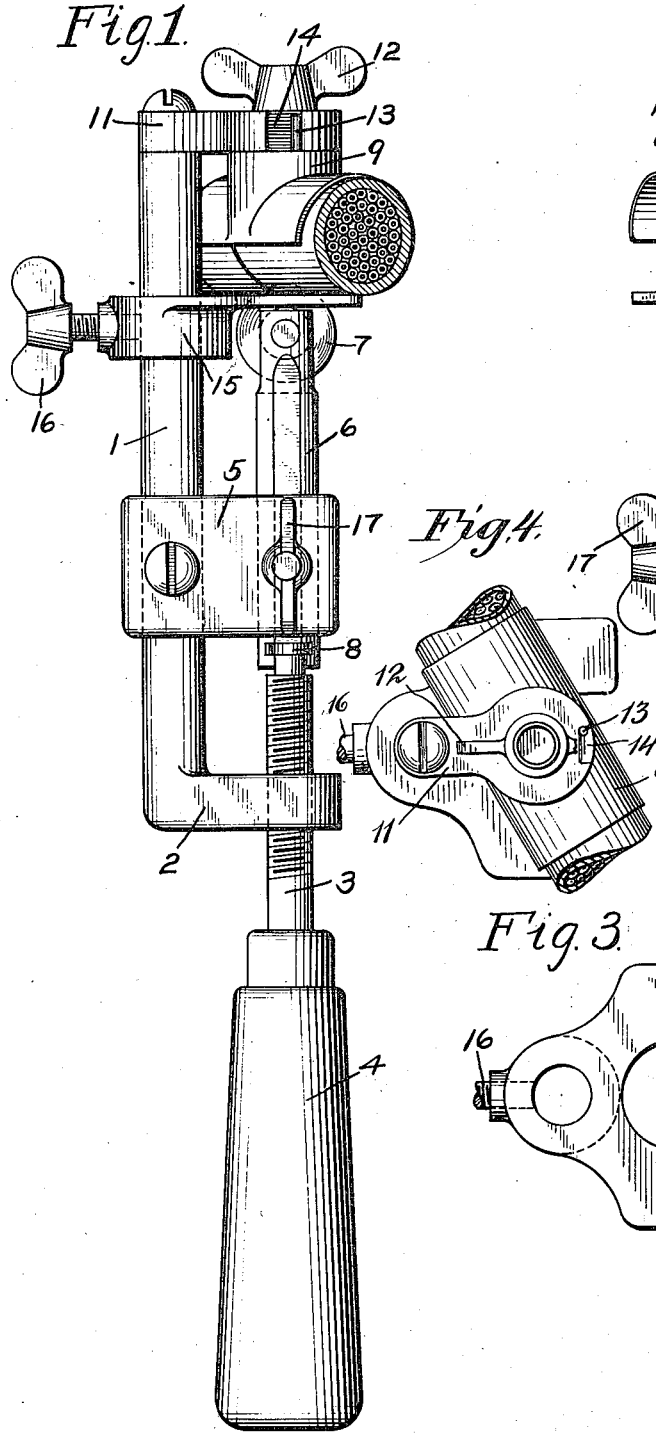

HENRY C. CLEVE, OF WASHINGTON, DISTRICT OF COLUMBIA.

SHEATH-REMOVING TOOL.

1,275,225.      Specification of Letters Patent.     Patented Aug. 13, 1918.

Application filed February 2, 1917. Serial No. 146,146.

*To all whom it may concern:*

Be it known that I, HENRY C. CLEVE, a citizen of the United States, residing at Washington, in the District of Columbia, have invented new and useful Improvements in Sheath-Removing Tools, of which the following is a specification.

This invention relates to cutting tools, and more particularly to a cutting tool having for its principal object the removal of metallic sheathing from cable in accordance with the process described and claimed in a companion application, Serial No. 146,145, filed February 2, 1917.

In the accompanying drawing; Figure 1 is a side elevation of a cutting tool embodying my invention; Fig. 2 a front elevation thereof, partly in section, and with the handle broken away; Fig. 3 a plan view of one of the guide members of the tool; and Fig. 4 a plan view of the cutting tool.

The tool may comprise a longitudinal body member 1 having an arm 2 at one end provided with a tapped hole for a screw-threaded rod 3 secured in a suitable operating handle 4.

Mounted within a guide block 5 secured to the body member 1 is a bar 6 carrying at one end a rotatable cutting wheel 7 and slotted at the opposite end for the reception of a head 8 formed on the end of the rod 3.

For holding the cable C in position, a semi-tubular guide member 9 is provided, which is semi-cylindrical so as to fit over the cable and has a threaded projection 10 adapted to extend through an opening in a plate 11 which is secured to the outer end of the member 1.

A thumb nut 12 is applied to the threaded projection 10 and is adapted to clamp the guide member 9 in position. For limiting the adjustment of the guide member 9, a pin 13 secured thereto is adapted to extend into a slot 14 which is cut in the plate 11, so that the movement of the member 9 is limited by the pin 13 striking the side walls of the slot 14, as shown in Fig. 4.

On the side of the cable opposite to the guide member 9 is a guide member 15, which is mounted on the body member 1 and is secured thereto by a thumb screw 16. The guide member 15 is centrally slotted to permit the cutting wheel 7 to engage the cable.

In operation, the thumb nut 12 is loosened and the guide member 9 is turned so that pin 13 engages the right hand wall of the slot 14, as shown in Fig. 1 of the drawing. The thumb-nut 12 is then screwed down, clamping the guide member 9 in position.

The cable which is to be stripped is then inserted within the guide member 9 and the guide member 15 is brought up to engage the opposite side of the cable, said guide member being clamped in position by screwing up the thumb-screw 16.

The thumb-screw 17 is then loosened and the handle 4 is rotated so as to screw the rod 3 inwardly and cause the bar 6 to move the cutter-wheel 7 into engagement with the metal covering of the cable. The cutter-wheel is now forced just through the metal covering and then the thumb-screw 17 is screwed up to firmly clamp the cutter bar 6 in position.

The tool is then turned around the cable by means of the handle 4, causing the cutter wheel 7 to cut a spiral groove in the cable sheath.

When the sheathing has been cut as far back as desired, the cutter-wheel 7 is withdrawn by loosening the thumb-screw 17 and then screwing out the rod 3 by the rotation of handle 4. The thumb-nut 12 is now loosened and the guide member 9 is turned so that the pin 13 engages the left wall of the slot 14. This adjusts the cable C so that the cutter wheel axis is parallel with the axis of the cable.

The handle 4 is now operated to force the cutter-wheel 7 into the cable sheathing and by turning the tool around the cable, the cut sheathing is severed from the uncut portion. The spirally cut portion of the metallic sheath may now be manually unwrapped from the cable, as will be evident, without injuring the insulation and without damage to the cable.

Having now described my invention, what I claim as new and desire to secure by Letters Patent, is:

1. A tool for removing cable casing, comprising a body member, a longitudinally adjustable bar carried by said body member and having a cutter wheel for engaging the cable casing, and guide members adapted to be secured in position on opposite sides of the cable, one guide member being adapted to hold the cable so that the axis of the cable forms an oblique angle with the axis of the cutter wheel.

2. A tool for removing cable casing, comprising a body member, a longitudinally adjustable bar carried by said body member and having a cutter wheel for engaging the cable casing, an adjustable member adapted to be applied to one side of the cable for holding the cable and having one position in which the axis of the cable is parallel with the axis of the cutter wheel and another position in which the axis of the cable forms an oblique angle with the axis of the cutter wheel and a guide member movable on said body member and adapted to be applied to the opposite side of the cable.

3. A tool for removing cable casing, comprising a body member, a longitudinally adjustable bar carried by said body member and having a cutter wheel for engaging the cable casing, a guide member adapted to engage one side of the cable and a guide member having a semi-cylindrical portion adapted to fit over the opposite side of the cable and provided with means for setting the guide member to different angular positions.

In testimony whereof I have hereunto set my hand.

HENRY C. CLEVE.